Aug. 12, 1969 — R. A. CLARKSON — 3,460,579
INSULATED FLEXIBLE SUB-ZERO HOSE
Filed April 12, 1966

INVENTOR
ROBERT A. CLARKSON
BY *Sol B. Wiczer*
ATTORNEY

# United States Patent Office 3,460,579
Patented Aug. 12, 1969

3,460,579
INSULATED FLEXIBLE SUB-ZERO HOSE
Robert A. Clarkson, 803 Joliet, Cahokia, Ill. 62206
Filed Apr. 12, 1966, Ser. No. 542,184
Int. Cl. F16l 59/14, 11/02, 11/12
U.S. Cl. 138—127                                     8 Claims This invention relates to improvements in a flexible metal hose insulated to retain flexibility and permit use at low temperatures. More particularly, the present invention relates to new improved insulated hose for conducting liquids or gases at low temperatures.

The present invention provides a new improved flexible metal hose which is insulated such that the flexibility and manageability of the hose structure remains practical, conducting fluids at temperatures below the freezing point of water, so that moisture condensation will not form and freeze on the outer hose structure reducing its flexibility in such use.

The present flexible metal hose generally comprises, in combination, an inner metal flexibly constructed tube, a braided metallic wire sheath for enclosing the metal tube about its length, and a thick insulating layer of plastic encasing said inner metal structures. The product preferably further includes a sealing layer mounted immediately over the braided wire sheath which serves both as a sealer and as a foundation layer for a superimposed covering insulation. Finally an outer fabric cover over the insulation is preferably used for protecting the assembly from abrasion or damage in use.

It is an object of this invention to provide a new improved insulated flexible metal hose having special application for conveying fluids at low temperature.

It is a further object of this invention to provide an insulated flexible metal hose having a degree of flexibility which is not greatly affected by low temperature conditions.

Figure 1:
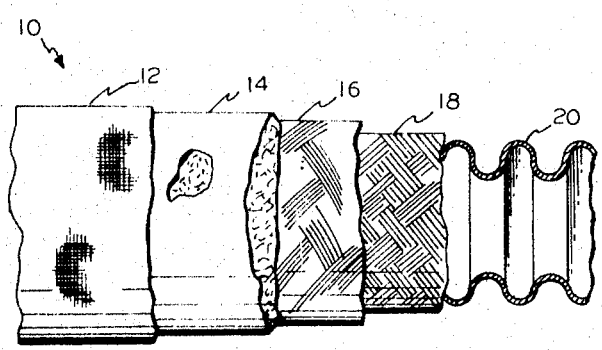
Figure 2:
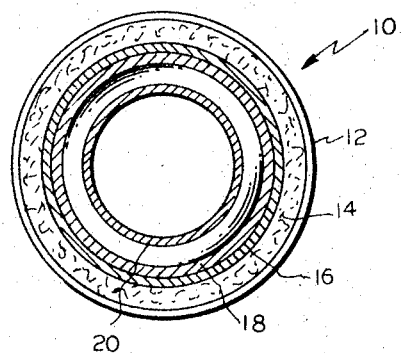

These and other objects and advantages of the present invention will become more apparent from the following detailed description taken in conjunction with the accompanying figures in which:

FIG. 1 is a longitudinal view taken partly in section and partly in elevation of an insulated flexible metal hose embodying the present invention; and FIG. 2 is a traverse sectional view thereof:

Referring to FIGS. 1 and 2 of the drawing, flexible metal hose 10 includes outer cover 12, insulation 14, sealant layer 16, braided wire sheath 18, and inner metal tube 20.

In manufacturing the hose structure of FIGS. 1 and 2, inner metal tube 20 is corrugated circumferentially or otherwise formed as a thin walled metal tube convoluted longitudinally for flexibility. Thereafter, the inner metal tube is enclosed by braided wire sheath 18 formed of interwoven or braided metal strands about the flexible tube, some of the strands of the sheath being wound in the opposite direction about the inner tube and interlaced with the first direction strands. These strands form a flexible sheath around the inner tube and permit air pockets to occupy the convoluted sections of the metal tube. The braided wire sheath may be secured frictionally about the metal tube or sometimes fastened directly thereto such as by welding, brazing or the like along the length of the tube or at various intervals thereof. Sometimes the interlaced metal sheath may be simple physically attached or mechanically attached to the metal tube by tube-end connecting fittings or the like, as desired. The interlaced metal sheath usefully limits wear by providing a firm unyielding cover for preventing twisting and lengthening of the inner tube under high internal pressures or high tensile stresses. The use of one, two, or more metal sheaths wound in the same or opposite directions may be employed for the purpose of regulating or permitting the desired stiffness or flexibility of the final tubing as desired.

After the braided wire sheath 18 is in place about inner flexible metal tube 20, the braided wire sheath is preferably covered by tape sealant layer 16 which provides a means for holding the wire sheath 18 in place and which prevents the metal wire sheath from unwinding or unraveling when the sheath is physically secured to the inner metal tube. It also traps an insulating air layer between the wire and convolutions of the inner metal tube. Tape sealant layer 16 may be formed as a single or multiple layer of plastic tape wound about the braided sheath or alternately, the layer may be extruded onto the sheath as a continuous film. Desirably vinyl materials such as polyvinyl chloride, polyvinyl chloride-acetate, or the like which may be characterized as rubber-like plastics are employed for the tape sealant layer. Alternately, materials such as Teflon tape, a polytetrafluoroethylene-type plastic tape manufactured by E. I. du Pont de Nemours, or other thermoplastic materials such as, for example, polyethylene, polypropylene and polytrifluorochloroethylene may be employed for the sealant layer. The tape layer may consist of one or more superimposed layers depending upon the performance requirements for the ultimately manufactured hose.

A thick layer of plastic foam 14 of effective heat insulating quality is now cast upon the sealing tape 16. Several foams are useful such as foamed rubber, polyacrylonitrile, or foamed silicone a desiraby available commercial type is known as Armaflex 22, manufactured by the Armstrong Cork Company. Alternately, still other foam type insulation materials formed of plastics, cork, asbestos or the like and characterized as being flexible under low temperature conditions while maintaining good insulation properties may also be employed. The thickness of the insulation layer is dependent upon the desired stiffness or flexibility desired of the final tubing. Usefully, the thickness of the insulation layer may range from about ⅛ to about ¾ inch and more specifically from about ¼ to ½ inch. As observed above the trapped air within the convoluted sections of the inner flexible metal tube supplements the effectiveness of insulation 14.

Over the applied insulation 14, which may be secured over sealant layer 16 by extrusion, by continuously wrapping a helical strip of insulation material about the tube, or by separate sections, is finally added a fabric cover 12 which is desirably formed of canvas or other similar material for protecting the included assembly from abrasion during use or from damage by foreign elements.

In use, the present flexible metal hose is found particularly suitable for conveying low temperature fluids be either liquids or gases, often at temperatures well below the normal freezing point of water so that frost or ice is prevented from forming as a crust upon the convoluted inner tube sections. Despite such low temperature fluid transfer, the hose is found to remain flexible and manageable and free of ice coating thereon.

It is to be understood that various changes and modifications may be made in the foregoing detailed description of the present invention without departing from the spirit and scope of the invention defined in the appended claims.

What is claimed is:

1. A flexible metal hose assembly for transfer of sub-freezing temperatures fluids which comprises in combination, a flexible corrugated inner metal tube, a braided wire sheath encasing said corrugated inner metal tube enclosing an insulated air space in each corrugation and a thick flexible insulating layer mounted over said flexible corrugated metal and metal braid extending the length thereof, whereby the hose assembly remains flexibly ice free and manageable at low temperatures.

2. The flexible metal hose assembly of claim 1 wherein the insulation layer is foamed plastic.

3. The flexible metal hose assembly of claim 1 wherein, the insulation layer is a foamed rubber.

4. The flexible metal hose assembly of claim 1 wherein a flexible sealant layer is interposed between the braided metal sheath and said insulating layer.

5. The flexible metal hose assembly of claim 1 wherein the sealant layer is selected from the group consisting of polyvinyl chloride plastic tape and polyvinyl chloride-acetate plastic tape.

6. The flexible metal hose assembly of claim 1 wherein the insulating layer is foamed silicone.

7. The flexible metal hose assembly of claim 1 wherein the hose assembly has an outer cover of strong fabric.

8. A flexible metal hose assembly which comprises in combination, a flexible corrugated inner metal tube, a flexible braided wire sheath encasing said corrugated inner metal tube along its length enclosing an insulated air space in each corrugation, a plastic tape sealant layer over the braided wire sheath, a thick flexible foamed insulating layer over said sealant layer, and an outer fabric covering extending the length of said insulation layer.

References Cited

UNITED STATES PATENTS

| | | | |
|---|---|---|---|
| 1,809,874 | 6/1931 | Stone | 138—124 XR |
| 2,146,559 | 2/1939 | Berkowitz. | |
| 2,150,471 | 3/1939 | Van Vulpen. | |
| 2,879,803 | 3/1959 | Francois | 138—126 |
| 3,095,337 | 6/1963 | Chase | 154—45 |

FOREIGN PATENTS

| | | |
|---|---|---|
| 874,007 | 8/1961 | Great Britain. |
| 157,762 | 2/1957 | Sweden. |

LAVERNE D. GEIGER, Primary Examiner

H. K. ARTIS, Assistant Examiner

U.S. Cl. X.R.

138—125